UNITED STATES PATENT OFFICE.

JOHN STEWART MacARTHUR, OF POLLOKSHIELDS, COUNTY OF RENFREW, AND ROBERT W. FORREST AND WILLIAM FORREST, OF GLASGOW, COUNTY OF LANARK, SCOTLAND.

PROCESS OF OBTAINING GOLD AND SILVER FROM ORES.

SPECIFICATION forming part of Letters Patent No. 403,202, dated May 14, 1889.

Application filed November 9, 1887. Serial No. 254,699. (No specimens.) Patented in England October 19, 1887, No. 14,174; in Cape of Good Hope January 7, 1888, No. 6/101; in Victoria January 19, 1888, No. 5,572; in New South Wales January 21, 1888, No. 453; in South Australia January 23, 1888, No. 948; in Tasmania January 24, 1888, No. 529; in New Zealand February 1, 1888, No. 2,775; in Canada February 6, 1888, No. 28,471; in France April 6, 1888, No. 189,808; in Belgium July 24, 1888, No. 82,673; in Brazil August 23, 1888, No. 619; in Portugal August 30, 1888, No. 1,272; in Italy September 30, 1888, No. 23,852, and in Spain October 2, 1888, No. 8,538.

*To all whom it may concern:*

Be it known that we, JOHN STEWART MAC-ARTHUR, a subject of the Queen of Great Britain, residing at 15 Princes Street, Pollokshields, in the county of Renfrew, Scotland, and ROBERT WARDROP FORREST and WILLIAM FORREST, both subjects of the Queen of Great Britain, residing at 319 Crown Street, Glasgow, in the county of Lanark, Scotland, have invented certain new and useful Improvements in Processes of Obtaining Gold and Silver from Ores, (for which we have obtained patents in the following countries; Great Britain, No. 14,174, dated October 19, 1887; Cape of Good Hope, No. 6/101, dated January 7, 1888; Victoria, No. 5,572, dated January 19, 1888; New South Wales, No. 453, dated January 21, 1888; South Australia, No. 948, dated January 23, 1888; Tasmania, No. 529, dated January 24, 1888; New Zealand, No. 2,775, dated February 1, 1888; Canada, No. 28,471, dated February 6, 1888; France, No. 189,808, dated April 6, 1888; Belgium, No. 82,673, dated July 24, 1888; Brazil, No. 619, dated August 23, 1888; Portugal, No. 1,272, dated August 30, 1888; Italy, No. 23,852, dated September 30, 1888, and Spain, No. 8,538, dated October 2, 1888;) and we do hereby declare that the following is a full, clear, and exact description of the invention, which will enable others skilled in the art to which it appertains to make and use the same.

This invention has principally for its object the obtaining of gold from ores; but it is also applicable for obtaining silver from ores containing it, whether with or without gold, and it comprises an improved process which, while applicable to auriferous and argentiferous ores generally, is advantageously and economically effective with refractory ores, or ores from which gold and silver have not been satisfactorily or profitably obtainable by the amalgamating or other processes hitherto employed, such as ores containing sulphides, arsenides, tellurides, and compounds of base metals generally, and ores from which the gold has not been easily or completely separable on account of its existing in the ores in a state of extremely fine division.

The invention consists in subjecting the auriferous or argentiferous ores to the action of a solution containing a small quantity of a cyanide, as hereinafter set forth, without any other chemically-active agent, such quantity of cyanide being reckoned according to its cyanogen, and the cyanogen being proportioned to the quantity of gold or silver, or gold and silver, estimated by assay or otherwise to be in the ores under treatment. By treating the ores with the dilute and simple solution of a cyanide the gold or silver is or the gold and silver are obtained in solution, while any base metals in the ores are left undissolved except to a practically inappreciable extent, whereas when a cyanide is used in combination with an electric current or in conjunction with another chemically-active agent—such as carbonate of ammonium, or chloride of sodium, or phosphoric acid—or when the solution contains too much cyanide, not only is there a greater expenditure of chemicals in the first instance, but the base metals are dissolved to a large extent along with the gold or silver, and for their subsequent separation involve extra expense, which is saved by our process.

In practically carrying out our invention we take the ore in a powdered state and mix with it the solution of a cyanide in a vessel made of or lined with any material not appreciably acted on by the solution. We employ a vessel made of or lined with wood; but it may be made of or lined with any ordinary inert material—such as stone, brick, slate, rubber, gutta-percha, cement, glass, earthenware, iron, (plain, tinned, or enameled,) or lead. The process is expedited by stirring or triturating the mixture of ore and solution intermittently or continuously, for which purpose any convenient mechanical agitator may be fitted to the vessel. A pan-mill with edge runners or other known triturating device may be advantageously used. The solution is allowed to act on the ore until the gold or silver is all or nearly all dissolved, and the solution is then drawn off from the ore or undissolved residue.

Any cyanide soluble in water may be used—such as ammonium, barium, calcium, potassium, or sodium cyanide, or a mixture of any two or more of them. We regulate the quantity of cyanide so that its cyanogen will be in proportion to the quantity of gold or silver or gold and silver in the charge of ore; but in all cases we dissolve it in sufficient water to keep the solution extremely dilute, because it is when the solution is dilute that it has a selective action such as to dissolve the gold or silver in preference to the baser metals.

In dealing with ores containing per ton twenty ounces or less of gold or silver or gold and silver, we find it most advantageous to use a quantity of cyanide the cyanogen of which is equal in weight to from one to four parts for every thousand parts of the ore, and we dissolve the cyanide in a quantity of water of about half the weight of the ore. We generally use a solution containing two parts of cyanogen for every thousand parts of the ore. In the case of richer ores, while increasing the quantity of cyanide to suit the greater quantity of gold or silver, we also increase the quantity of water so as to keep the solution dilute. In other words, the cyanide solution should contain from two to eight parts, by weight, of cyanogen to one thousand parts of water, and the quantity of the solution used should be determined by the richness of the ore. After the solution has been decanted or separated from the undissolved residues the gold and silver may be obtained from it in any convenient known way—such as evaporating the solution to dryness and fusing the resulting saline residue, or by treating the solution with sodium amalgam.

Having fully described our invention, what we desire to claim and secure by Letters Patent is—

The process of separating precious metal from ore containing base metal, which process consists in subjecting the powdered ore to the action of a cyanide solution containing cyanogen in the proportion not exceeding eight parts of cyanogen to one thousand parts of water.

JOHN STEWART MacARTHUR.
ROBT. W. FORREST.
W. FORREST.

Witnesses:
ROBT. DUNLOP,
WILLIAM BRUNTON,
*Law clerks, both of* 160 *West George Street, Glasgow.*